(12) United States Patent
Lawall

(10) Patent No.: US 7,894,074 B2
(45) Date of Patent: Feb. 22, 2011

(54) LASER DOPPLER VIBROMETER EMPLOYING ACTIVE FREQUENCY FEEDBACK

(75) Inventor: John Lawall, Bethesda, MD (US)

(73) Assignee: The United States of America as represented by the Secretary of Commerce, NIST, Washington, DC (US)

(*) Notice: Subject to any disclaimer, the term of this patent is extended or adjusted under 35 U.S.C. 154(b) by 185 days.

(21) Appl. No.: 12/317,107

(22) Filed: Dec. 19, 2008

(65) Prior Publication Data

US 2009/0147267 A1 Jun. 11, 2009

(51) Int. Cl.
G01B 9/02 (2006.01)
G01B 11/02 (2006.01)
G01N 21/41 (2006.01)
G01N 29/04 (2006.01)

(52) U.S. Cl. .................. 356/485; 73/657; 356/502; 356/492

(58) Field of Classification Search .............. 356/485, 356/486, 487, 492, 493, 502; 73/657
See application file for complete search history.

(56) References Cited

U.S. PATENT DOCUMENTS

| 4,865,450 | A* | 9/1989 | Munechika et al. ......... 356/489 |
| 7,117,741 | B2* | 10/2006 | Klein et al. .................. 73/579 |
| 7,382,468 | B2* | 6/2008 | Kataoka ..................... 356/498 |
| 2006/0114468 | A1* | 6/2006 | Kataoka ..................... 356/450 |

* cited by examiner

Primary Examiner—Patrick J Connolly
(74) Attorney, Agent, or Firm—Daphne L. Burton; Burton IP Law Group

(57) ABSTRACT

A laser Doppler vibrometer for vibration measurement that employs active feedback to cancel the effect of large vibration excursions at low frequencies, obviating the need to unwrap phase data. The Doppler shift of a reflective vibrating test object is sensed interferometrically and compensated by means of a voltage-controlled oscillator driving an acousto-optic modulator. For frequencies within the servo bandwidth, the feedback signal provides a direct measurement of vibration velocity. For frequencies outside the servo bandwidth, feedback biases the interferometer at a point of maximal sensitivity, thus enabling phase-sensitive measurement of the high-frequency excursions. Using two measurements, one with a low bandwidth and one with a high bandwidth, more than five decades of frequency may be spanned. This approach is of particular interest for the frequently occurring situation where vibration amplitudes at low frequency exceed an optical wavelength, but knowledge of the vibration spectrum at high frequency is also important.

19 Claims, 12 Drawing Sheets

LASER DOPPLER VIBROMETER EMPLOYING ACTIVE FREQUENCY FEEDBACK

STATEMENT REGARDING FEDERALLY SPONSORED RESEARCH/DEVELOPMENT

The subject matter of this patent application was invented by employees of the United States Government. Accordingly, the United States Government may manufacture and use the invention for governmental purposes without the payment of any royalties.

BACKGROUND OF THE INVENTION

1. Field of Invention

The present disclosure relates to interferometers and, more particularly, to an optical heterodyne Michelson interferometer that employs active frequency feedback in order to measure vibrations over a large dynamic range with high sensitivity and minimal post-processing.

2. Description of Related Art

Mechanical vibration measurements may be obtained using a number of optical techniques. Such optical techniques may include, but are not limited to, laser speckle analysis, position-sensitive detector use, and holography. While execution of these optical techniques may vary considerably, many such optical techniques employ Michelson interferometers and thus rely on basic principles such as the Doppler effect. In accordance with the Doppler effect and its use in optical interferometric vibration measurements, light reflected from a moving surface experiences a frequency shift that is proportional to its instantaneous velocity.

For purposes of mechanical vibration measurements, data may be extracted from a Doppler-shifted beam. To determine the displacement of a mechanical vibration, the Doppler-shifted beam may be optically beaten with a reference beam. The phase of the beat signal is directly related to the displacement of the vibrating test object. To determine the velocity of a mechanical vibration, changes in the frequency of the beat signal may be measured.

Laser Doppler vibrometers (LDVs)—which often incorporate Michelson-based interferometers—may be employed in mechanical vibration measurements. Using these LDVs, it is customary to infer either the target displacement or target velocity from the interference between the reflected light and a reference beam.

Displacement measurements may be more desirable than velocity measurements since greater accuracy may be obtained through displacement measurements. However, it may be difficult to measure small displacements at high frequencies in the presence of large displacements at low frequencies.

There is a need for an optical technique for mechanical vibration measurements that nulls out the effect of large vibration excursions at low frequencies.

A number of prior art systems require phase unwrapping in order to obtain a vibration measurement. The processing associated with unwrapping the time-domain signal may impose harsh restrictions on data storage and the dynamic range on which the phase is digitized.

There is a need for an optical technique for mechanical vibration measurements that does not require such harsh restrictions on data storage and the dynamic range on which the phase is digitized.

BRIEF SUMMARY OF DISCLOSURE

The present disclosure addresses the foregoing deficiencies of the prior art by providing a laser Doppler vibrometer system and method employing active frequency feedback for mechanical vibration measurements.

In accordance with one embodiment of the present disclosure, the system comprises a first optical system having a light source, the first optical system being configured to generate two beams, the first optical system having an acousto-optic modulator driven by a voltage-controlled oscillator, said acousto-optic modulator and voltage-controlled oscillator being configured to cause one of said beams to be controllably shifted in frequency relative to the other of said beams. The system further includes a second optical system having a Michelson interferometer configuration, the second optical system having two arms, the two arms being configured to receive the two beams from the first optical system, wherein the first of said arms employs a reflective vibrating test object that is configured to retroreflect a first beam that travels to the reflective vibrating test object, and the other of said arms employs a static reference mirror that is configured to retroreflect a second beam that travels to the static reference mirror. The second optical system is configured to recombine the two retroreflected beams from the vibrating test mirror and the static reference mirror so as to generate an optical interference signal.

The system still further includes a conversion device configured to receive the two beams from the second optical system, the conversion device being further configured to convert one or more optical signals that were received from the second optical system into an electrical signal.

The system yet further includes a phase meter device configured to provide a phase difference between the frequency signal received from the photodetector and a reference signal, the phase meter device being further configured to output the phase difference as a voltage. The system also includes a controller configured to close a feedback loop.

When the feedback loop is closed, a frequency shift imposed by the voltage-controlled oscillator cancels the Doppler shift imposed by the motion of the vibrating test object so that the phase difference between the signal at the output of the photodetector and the reference signal of the phase meter is substantially zero.

In accordance with another embodiment of the present disclosure, a laser Doppler vibrometer employing active frequency feedback for mechanical vibration measurements is provided. The system comprises a laser light source configured to generate a laser light beam; a first polarizing beam splitter that is configured to receive a laser light beam from the laser light source and split the laser light beam into two beams having orthogonal linear polarizations.

The system further comprises a first acousto-optic modulator configured to shift the frequency of one of the said beams by a fixed amount, and a second acousto-optic modulator configured to shift the frequency of the other of the said beams by a variable amount.

The system further comprises a voltage-controlled oscillator configured to drive one of said acousto-optic modulators, and a Michelson interferometer optical system configured to receive the two beams from the first optical system, the Michelson interferometer optical system having two arms, wherein the first of said arms employs a reflective vibrating test object that is configured to retroreflect the first beam that travels to the vibrating test object, and the other of said arms employs a static reference mirror that is configured to retroreflect the second beam that travels to the static reference mirror, and wherein the Michelson interferometer optical system is configured to recombine the two retroreflected beams from the reflective vibrating test object and the static reference mirror.

The system still further comprises a polarization analyzer configured to receive the two beams from the Michelson interferometer optical system, the polarization analyzer being further configured to generate an optical interference signal; a photodetector configured to receive one or more optical interference signals, the photodetector being further configured to convert one or more optical interference signals that were received from the polarization analyzer into one or more electrical interference signals. The system also comprises a lock-in amplifier having a reference signal, the lock-in amplifier being further configured to provide a phase difference between the one or more electrical interference signals received from the photodetector and the reference signal, the lock-in amplifier being further configured to output the phase difference as a voltage.

The system also comprises a controller configured to close a feedback loop, and when the feedback loop is closed, a frequency shift imposed by the voltage-controlled oscillator cancels the Doppler shift imposed by the motion of the vibrating test object so that the phase difference between the frequency signal at the output of the photodetector and the reference signal of the phase meter is substantially zero.

In accordance with yet another embodiment of the present disclosure, a method is provided for measuring mechanical vibrations of a test object using a laser Doppler vibrometer system that employs active frequency feedback, the method comprising the steps of generating two optical laser beams, each of said beams having different controllable optical frequencies, the first beam having a fixed frequency shift, the second beam having a tunable frequency shift relative to a substantially fixed laser frequency, wherein the step of generating two optical laser beams includes the step of driving an acousto-optic modulator with a voltage-controlled oscillator.

The method further comprises receiving the two generated optical laser beams at a Michelson interferometer, the Michelson interferometer having two arms, wherein the first of said arms employs a reflective vibrating test object that is configured to retroreflect a first beam that travels to the reflective vibrating test object, and the other of said arms employs a static reference mirror that is configured to retroreflect a second beam that travels to the static reference mirror, and wherein the Michelson interferometer is configured to recombine the two retroreflected beams from the reflective vibrating test object and the static reference mirror.

The method still further comprises generating an optical interference signal; converting the optical interference signal into an electrical interference signal; determining a phase difference between the electrical interference signal and a reference signal; and expressing the phase difference as a voltage.

The method also comprises closing a feedback loop; and forcing a frequency shift imposed by the voltage controlled oscillator to cancel the Doppler shift imposed by the reflective vibrating test object such that the phase difference is substantially zero.

These, as well as other objects, features and benefits will now become clear from a review of the following detailed description of illustrative embodiments and the accompanying drawings.

DETAILED DESCRIPTION OF THE DISCLOSURE

The optical heterodyne interferometer system and method of the present disclosure employs active feedback to substantially cancel the effects of large vibration excursions at low frequencies. The interferometer may be used to measure vibrations over a large dynamic range with high sensitivity and minimal post-processing.

The laser Doppler vibrometer system described herein includes a laser and two acousto-optic modulators configured to generate two optical beams. These two beams have a well defined heterodyne frequency separation $\Delta f$, which can be for example 1 MHz. One of the acousto-optic modulators may be driven by a voltage-controlled oscillator so that the difference frequency can be changed by a small amount. In the present case, the difference frequency may be about ~15 kHz.

The optical beams may have orthogonal linear polarizations. The optical beams may be separated using a polarizing beam splitter. A Michelson interferometer may incorporate the two optical beams in different arms, thus splitting the two beams and retroreflecting the beams from a static mirror and moving target mirror back in the direction from which the beams came. Upon retracing their paths to the original beam splitter that separated them, the optical beams may be reflected so as to interfere with each other. The arm or branch of the Michelson interferometer having the moving target mirror may also incorporate the vibrating test object. In the examples presented herein, the vibrating test object is a cryostat having a target mirror disposed within its structure. However, it should be understood that other mechanical vibration measurements may be taken for other objects as well, including an object which is smooth and reflective, or to which a small reflective mirror or surface can be attached. Examples of such objects include motors, water pipes, musical instruments, electronic instruments and scientific instruments. The other arm of the Michelson interferometer may include a static reference mirror.

A photodetector may receive the light from the Michelson interferometer. Importantly, active feedback may be applied to the voltage-controlled oscillator in order to force the phase of the demodulated signal to substantially zero. This feedback operates to cause the frequency for the voltage controlled oscillator to follow the Doppler shift imposed by the vibrating target.

Figure 1:
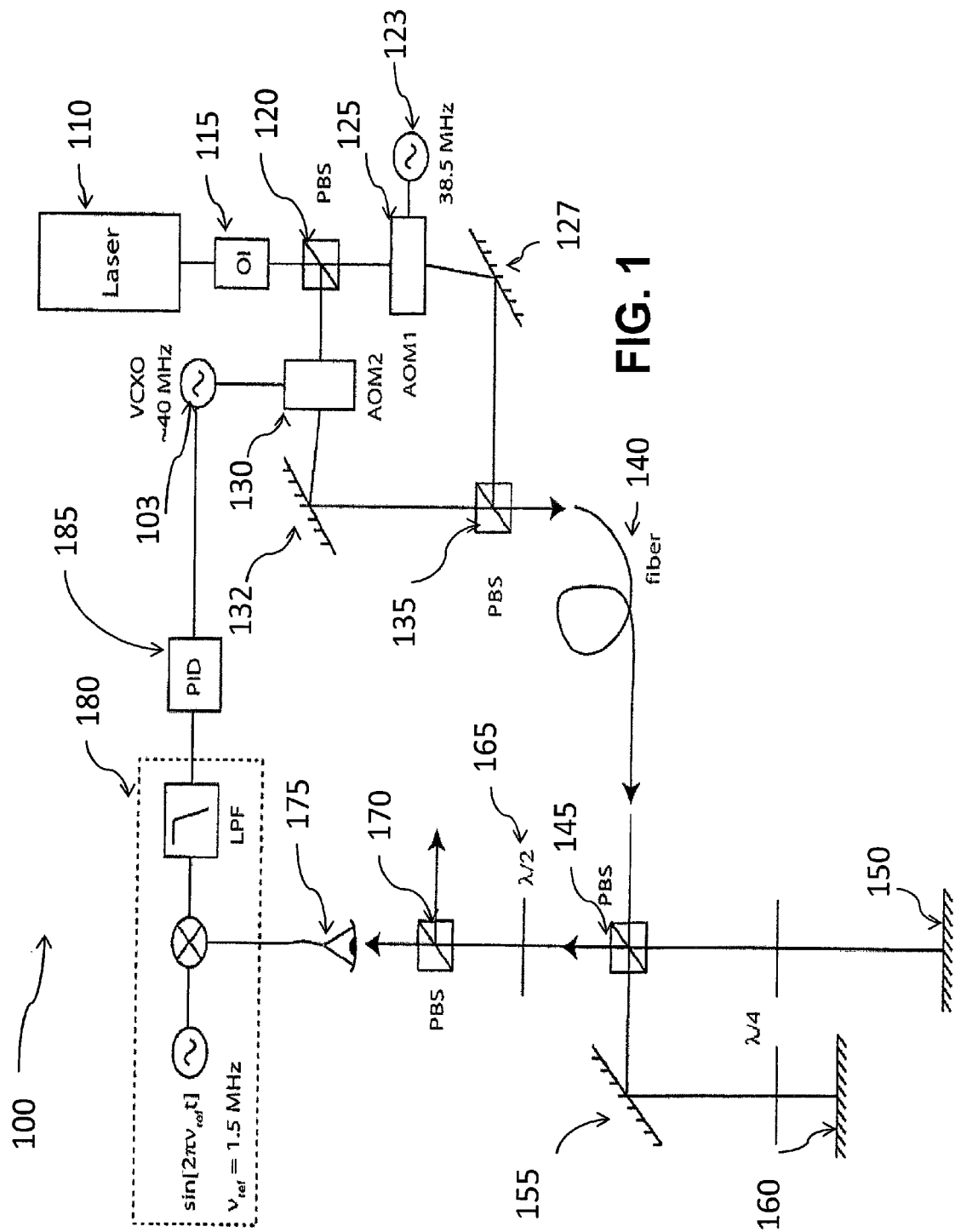
FIG. 1 is a diagram of components for a laser Doppler vibrometer system employing active feedback in accordance with one embodiment of the present disclosure.

Referring now to FIG. 1, illustrated is a diagram of optical and electronic components 100 for a laser Doppler vibrometer system that employs active frequency feedback in accordance with one embodiment of the present disclosure.

Laser 110 is a polarization-stabilized single-mode helium-neon laser. Such lasers are commonly used in optical applications, particularly since they are inexpensive and simple to use. However, it should be understood that other types of lasers may be used without departing from the inventive concept for the present LDV system.

Light from helium-neon laser 110 has a wavelength of about 633 nanometers (nm). Optical isolator 115 may be used to block out reflected and unwanted light from laser 110, and permit transmission of light from laser 110 in a single direction toward a first polarizing beam splitter 120. While optical isolator 115 is not a required feature to implement the invention, it is useful for these purposes. At the first polarizing beam splitter 120, the light from laser 110 is split into two beams of orthogonal linear polarization.

One of the two beams that emanates from polarizing beam splitter 120 may be given a fixed frequency shift of 38.5 MHz by acousto-optic modulator 125, which is driven by synthesizer 123. The other of the two beams may be given a frequency shift that is tunable by about 15 kHz around a nominal frequency of 40 MHz using a voltage-controlled crystal oscillator 103 to drive acousto-optic modulator 130. (These frequencies are given by way of example and without limitation.)

Although the present embodiment includes two acousto-optic modulators, it should be understood that other embodiments of the invention could incorporate a single acousto-optic modulator without departing from the inventive concept. Moreover, in lieu of an acousto-optic modulator, other types of frequency shifters may be used. Although the present embodiment includes a voltage-controlled crystal oscillator 103, it should be understood that other types of voltage-controlled oscillators may be used.

The two frequency-shifted beams may be combined thereafter on a second polarizing beam splitter 135. The beams may then be injected into a polarization-maintaining single-mode fiber 140. The polarization-maintaining single-mode fiber 140 may have benefits over other optical fibers. This polarization-maintaining single-mode fiber 140 may mitigate effects associated with mechanical stress. The polarization-maintaining single-mode fiber 140 further permits clean separation of the beams that lead to the Michelson interferometer portion of the LDV system.

After the light emerges from the fiber 140, it enters the Michelson interferometer portion of the LDV system. At this point, the light may be collimated and split with a third polarizing beam splitter 145. The polarizations of reflected light from target mirror 150 and reference mirror 160 may be changed using quarter-wave retarders, thus allowing the beams to emerge from polarizing beam splitter 145 in a direction perpendicular to the direction in which the beams entered the polarizing beam splitter 145. As for the components labeled as target mirror 150 and reference mirror 160, it should be understood that they are interchangeable so that mirror 150 could be a reference mirror and mirror 160 could be the target mirror. Moreover, it should be understood that mirrors 127, 132, 155 are not germane to operation of the present LDV system.

An optical interference signal may be obtained using a polarization analyzer that includes half-wave plate 165 and fourth polarizing beam splitter 170. If the optical interference signal from the Michelson interferometer which is received at the polarization analyzer was demodulated at exactly the heterodyne frequency ($\Delta f$), the demodulated phase would be directly proportional to the displacement of the vibrating test object only over a range of about half of the optical wavelength. Here, we used a helium-neon laser 110 that emits light having a wavelength ($\lambda$) of about 633 nm. Accordingly, the demodulated phase would be directly proportional to displacement for only about 316-317 nm.

For larger displacements, the phase would vary discontinuously and the output would reflect only the actual displacement over a small range. While some prior art LDV techniques incorporate phase unwrapping for purposes of a complete description of inferred motion, such phase unwrapping may impose a significant demand on processing time.

Moreover, if it is desirable to have a sensitive measurement of small vibration amplitudes at large frequencies, it is also desirable to maintain a high dynamic range throughout the signal processing.

A photodetector 175 may be used to take the optical interference signal from the Michelson interferometer and convert it to an electrical interference signal. As an example and without limitation, the photodetector may have a bandwidth of 10 MHz and a noise equivalent power (NEP) of 15 pW/Hz$^{1/2}$. It should be noted that, for purposes of the present disclosure, noise equivalent power is defined as the minimum detectable power per square root bandwidth. The average optical power falling on the photodetector 175 may be 85 µW.

The sinusoidal output from the photodetector 175 may have a nominal frequency of 1.5 MHz, with the exact instantaneous frequency being determined by the motion of the target mirror 160 and the frequency of the voltage-controlled oscillator 103. The output signal may be sent to fast lock-in amplifier 180, which may provide a phase difference between the frequency signal received from the photodetector 175 and a reference signal, and output the phase difference as a voltage.

Fast lock-in amplifier 180 is used for demodulation of the signal from the photodetector 175. This amplifier 180 has two analog outputs proportional to the sine and cosine of the phase difference between the reference oscillation and the input signal.

Either one of the quadrature outputs of amplifier 180 may be sent to a proportional-integral-derivative (PID) controller 185 or another similar controller. The output of controller 185 may drive the control voltage of voltage-controlled oscillator 103. Using this configuration, when the loop is closed, feedback may be used to change the frequency shift imposed by the voltage-controlled oscillator 103.

Moreover, and perhaps most importantly, the feedback may force the frequency shift that is driving the acousto-optic modulator 130, to cancel the Doppler shift that may be imposed by the motion of the target mirror 150. Accordingly, the phase difference between the reference for amplifier 180 and the optically detected signal is substantially zero.

The active feedback design of the present LDV system permits inferences related to spectral analysis of the applied feedback. More particularly, since the Doppler shift is directly proportional to the target velocity, the vibration velocity within the servo bandwidth of the feedback loop may be inferred. Accordingly, the feedback signal permits the inference of vibration velocity for low frequencies, e.g., 0.1 Hz to 5 kHz.

Through employing active feedback, the LDV system of the present disclosure does not require the phase unwrapping that may be required by other LDV systems. For frequencies outside the bandwidth of the feedback loop, the fluctuating displacements may be inferred from the fluctuating demodulated phase. However, because the fluctuations in displacement ($\Delta x$) will be substantially smaller than $\lambda/2$, phase unwrapping is not required. The demodulated signal may be sent directly to a spectrum analyzer, which may be a Fourier Transform spectrum analyzer. Alternatively, other types of analyzers may be employed, if available, such as an analog audio frequency analyzer.

Fluctuations in the demodulated phase permit inference of fluctuating displacement at "high" frequencies, e.g., 256 Hz to 50 kHz. As will be shown in the results, when comparing the range considered to be "low" frequency (0.1 Hz to 5 kHz) to the range considered to be "high" frequency (256 Hz to 50 kHz), there is a significant overlap where both methods give consistent results.

Using prior art LDVs, it is customary to infer either the target displacement or target velocity from the interference between the reflected light and a reference beam. However, the LDV of the present disclosure measures both position and velocity, each in the frequency range where it is best suited.

Because the present LDV system has a feedback signal that allows the user to extract the vibration velocity for "low" frequencies, and to use fluctuations in the demodulated phase to infer fluctuating position at "high" frequencies, the LDV system of the present disclosure gives a far more sensitive measurement and greater dynamic range than possible by measuring velocity alone. Moreover, the LDV system of the present disclosure is less demanding with respect to processing and is simpler than a measurement that relied on phase measurement to merely measure displacement.

The LDV system of the present disclosure may be used in two modes. The first mode may be termed a "high gain, high servo bandwidth" mode where the voltage controlled oscillator 103 follows the Doppler shift exactly. In this high gain mode, the frequency of the voltage controlled oscillator 103 is used to infer the velocity of the vibrating test object.

The second mode may be termed a "low gain, low servo bandwidth" mode. In this mode, only enough feedback is used to maintain a phase difference well below $\pi/2$ in absolute value. In this low gain mode, the feedback may be disregarded for frequencies that are substantially above the feedback bandwidth. The interferometer may be biased close to its point of maximum sensitivity. At this point, one of the quadrature outputs may be proportional to the phase difference between the reference oscillation and the input signal. Excursions of the quadrature output correspond to the displacement of the reflector at high frequencies.

The electric fields of the beams that are reflected from the mirrors incident on the photodetector 175 have time dependencies which may be expressed mathematically as follows:

$$E_1(t) \propto \cos[2\pi(v_L+v_1)t] \quad \text{(Equation 1)}$$

$$E_2(t) \propto \cos[2\pi(v_L t+2x(t)/\lambda+\int' v_2(t')dt')] \quad \text{(Equation 2)}$$

wherein $\lambda$ is the wavelength of light from the He-Ne laser 110 having optical frequency $v_L$, x(t) represents the motion of the target mirror 150, and wherein the frequencies $v_1$ and $v_2$ represent the frequencies used to drive acousto-optic modulators 125, 130, respectively.

The detected optical power P(t) incident on photodetector 175 may be expressed mathematically as follows:

$$P(t)=P_0\{1+\cos[2\pi(v_1 t-\int' v_2(t')dt'-2x(t)/\lambda)]\} \quad \text{(Equation 3)}$$

wherein $P_0$ represents the average optical power incident on the photodetector 175. Significantly, as shown by the above formula, fluctuations in position x may be compensated by adjustments in frequency $v_2(t)$.

As discussed hereinabove, the active frequency feedback employed in the present LDV system is useful in reducing processing demands. As such, it may be useful to measure the performance of the present LDV system and compare the obtained results to obtained results for a similar system that does not employ active feedback—that is, a system where the frequency $v_2$ is constant. In this case, we begin by obtaining results for an LDV system that does not employ active feedback. In each performance scenario described hereinafter the results were for a target mirror inside a closed-cycle cryostat operating at 4K.

In this connection, to transform the LDV system of the present disclosure to one that does not employ active feedback, the voltage controlled oscillator 103 that drives acousto-optic modulator 130 may be replaced with a synthesizer. In addition, the quadrature outputs from the lockin amplifier 180 may be sent to a storage oscilloscope for storage of data to be used for post-processing, such as phase unwrapping.

Considering the case of no feedback where the frequency $v_2$ is constant, the detected optical power incident on detector, P(t) may be expressed mathematically as follows:

$$P(t)=P_0\{1+\cos[2\pi(\Delta vt-2x(t)/\lambda)]\} \quad \text{(Equation 4)}$$

wherein $P_0$ represents the average optical power incident on the photodetector 175, and wherein $\Delta v=v_2-v_1$ and represents the difference between the frequencies used to drive acousto-optic modulators 125, 130. In the present embodiment, $\Delta v$ is 1.5 MHz. This frequency of 1.5 MHz may be selected because it may be sufficiently high that the laser amplitude noise is at the shot-noise limit. Moreover, this 1.5 MHz frequency may be selected because it is within the bandwidth of the digital lock-in amplifier used for demodulation.

In this no feedback example, the interference signal may be detected by a photodetector 175 where it may be amplified with a gain, K, which may be expressed in terms of Volts/Watt. After the signal has been output from the photodetector 175 it may be presented to the lock-in amplifier with a reference frequency $v_{ref}$, time constant $\tau$, and dimensionless gain G. The quadrature outputs X(t) and Y(t) may be expressed according to the following equations:

$$X(t) = GK\langle P(t)\cos(2\pi v_{ref}t)\rangle \quad \text{(Equation 5)}$$
$$= GK\frac{P_0}{2}\cos\{2\pi[(v_{ref} - \Delta v)t + 2x(t)/\lambda]\}$$

$$Y(t) = GK\langle P(t)\sin(2\pi v_{ref}t)\rangle \quad \text{(Equation 6)}$$
$$= GK\frac{P_0}{2}\sin\{2\pi[(v_{ref} - \Delta v)t + 2x(t)/\lambda]\}$$

wherein the angle brackets denote time averaging on a scale given by τ. The phase may be expressed mathematically as follows:

$$\Phi(t) = \tan^{-1}\frac{Y(t)}{X(t)}$$ (Equation 7)
$$= 2\pi[(v_{ref} - \Delta v)t + 2x(t)/\lambda]$$

Displacement may be expressed as x(t), and may be measured in units of $\lambda/(4\pi)$. If preferred, the analysis may be simplified by mixing $v_1$ and $v_2$ to generate an electronic signal having a frequency of $\Delta v$, and using this signal as $v_{ref}$.

Figure 2:
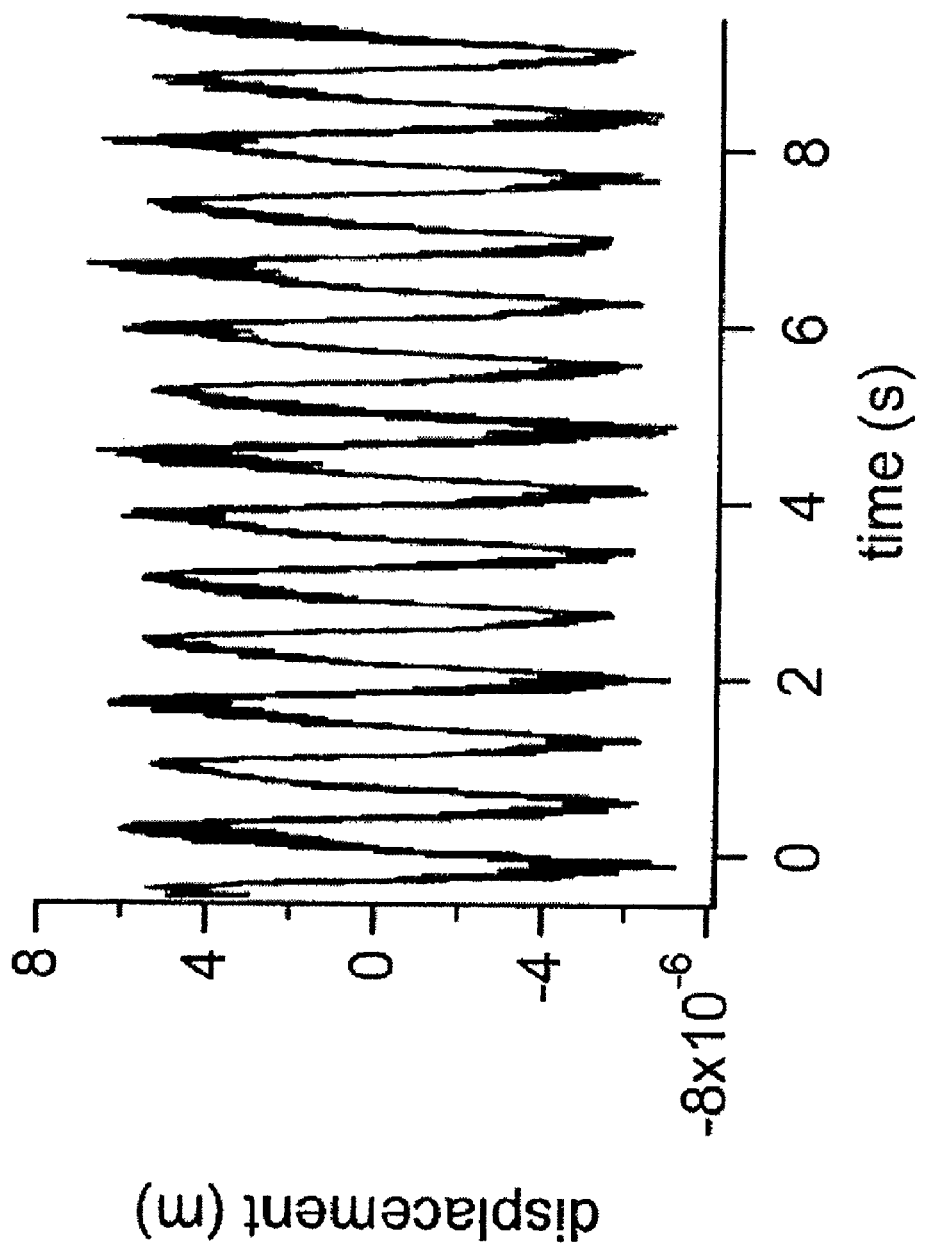
FIG. 2 is a graphical illustration of the motion of a vibrating test object in the time domain for a laser Doppler vibrometer system that does not employ active feedback.

Referring now to FIG. 2, a graphical illustration shows the motion of the target mirror-cryostat combination in the time domain as evaluated according to Equation 7 hereinabove. As shown, the estimated motion of the test object is dominated by a spectral component at 1.4 Hz, and peak-to-peak amplitude of about 12 micrometers (μm). This amplitude corresponds to about 38 optical fringes.

Figure 3:
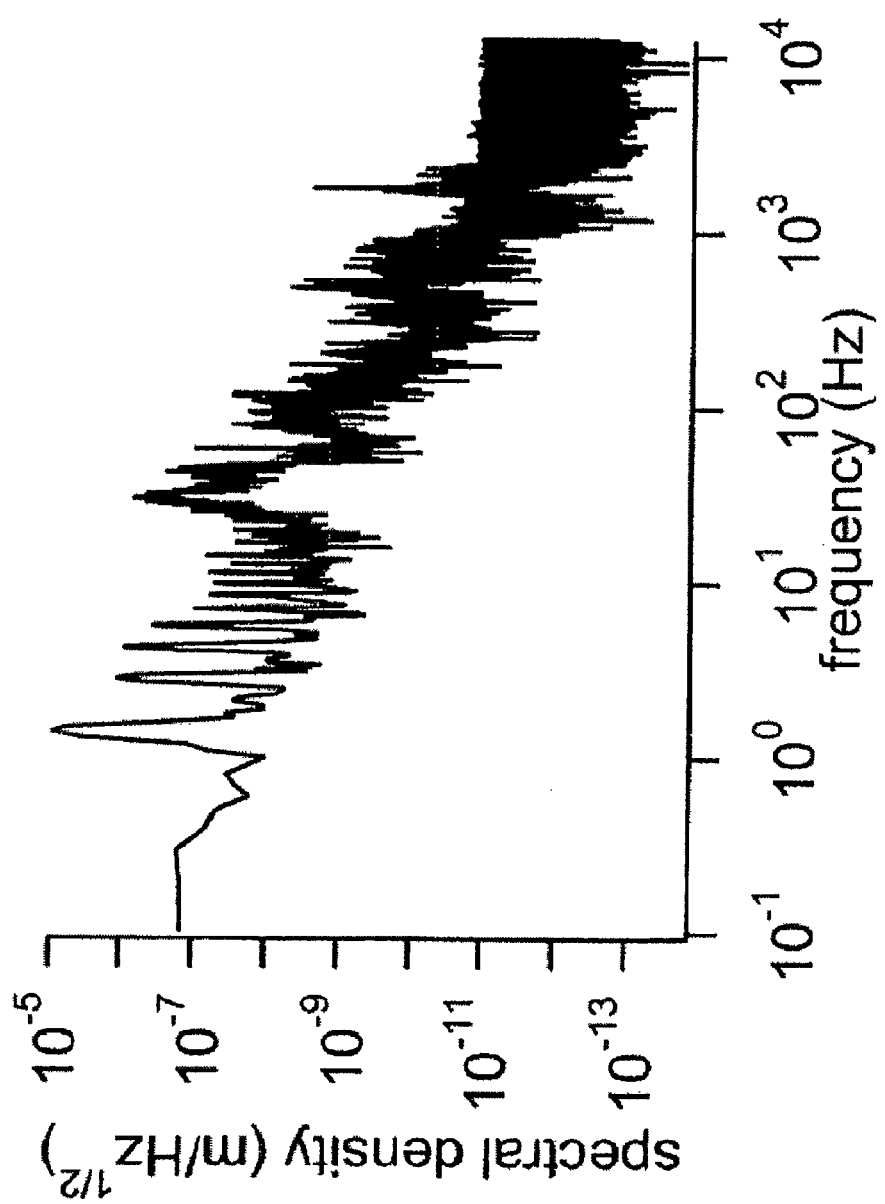
FIG. 3 is a graphical illustration of the frequency-domain spectrum that corresponds to the results shown in FIG. 2.

Referring now to FIG. 3, illustrated is the frequency-domain spectrum that corresponds to the results shown in FIG. 2.

The outputs X(t) and Y(t) may be discretized on eight bits in the storage oscilloscope. The amplitude of the motion at high frequencies may be quite small. Because of the discretization of the outputs and the small amplitude of motion, the spectrum has become relatively noisy.

The present LDV system provides for a less noisy spectrum. In addition, the LDV system of the present disclosure uses active frequency feedback which is designed for, inter alia, greater sensitivity. These features can be better illustrated by way of example. Referring back to FIG. 1, we can use the present LDV system and its voltage-controlled oscillator to employ active feedback. The present LDV system provides consistent results whether employed with weak feedback or strong feedback.

Considering the case of weak feedback, the frequency $v_2$ may be forced to change, with the goal of keeping the quadrature output Y(t) close to zero. The lock-in output may still be expressed as:

$$Y(t) = GK(P(t)\sin(2\pi v_{ref} t))$$ (Equation 8)

However, because the frequency $v_2$ will be forced to change, the related quadrature output Y(t) must now be expressed as follows:

$$Y(t) = GK\frac{P_0}{2}\sin\left[2\pi\left(\int^t v_2(t')dt' - v_1 t + v_{ref} t + 2x(t)/\lambda\right)\right]$$ (Equation 9)

It should be further noted that feedback acts to enforce the following condition:

$$\int^t v_2(t')dt' - v_1 t + v_{ref} t - 2x(t)/\lambda$$ (Equation 10)

If the above Equation 10 is differentiated, it may be expressed as follows:

$$v_2(t) = v_1 - v_{ref} - 2\dot{x}(t)/\lambda$$ (Equation 11)

As indicated by the equation above, for a system using active frequency feedback, the frequency $v_2$ is forced to a nominal value of $v_1 - v_{ref}$. The frequency $v_2$ changes to track the Doppler shift $2\dot{x}(t)/\lambda$ that is imposed by the vibrating test object or target mirror. Such changes are tracked within the frequency band in which feedback is active.

Figure 4:
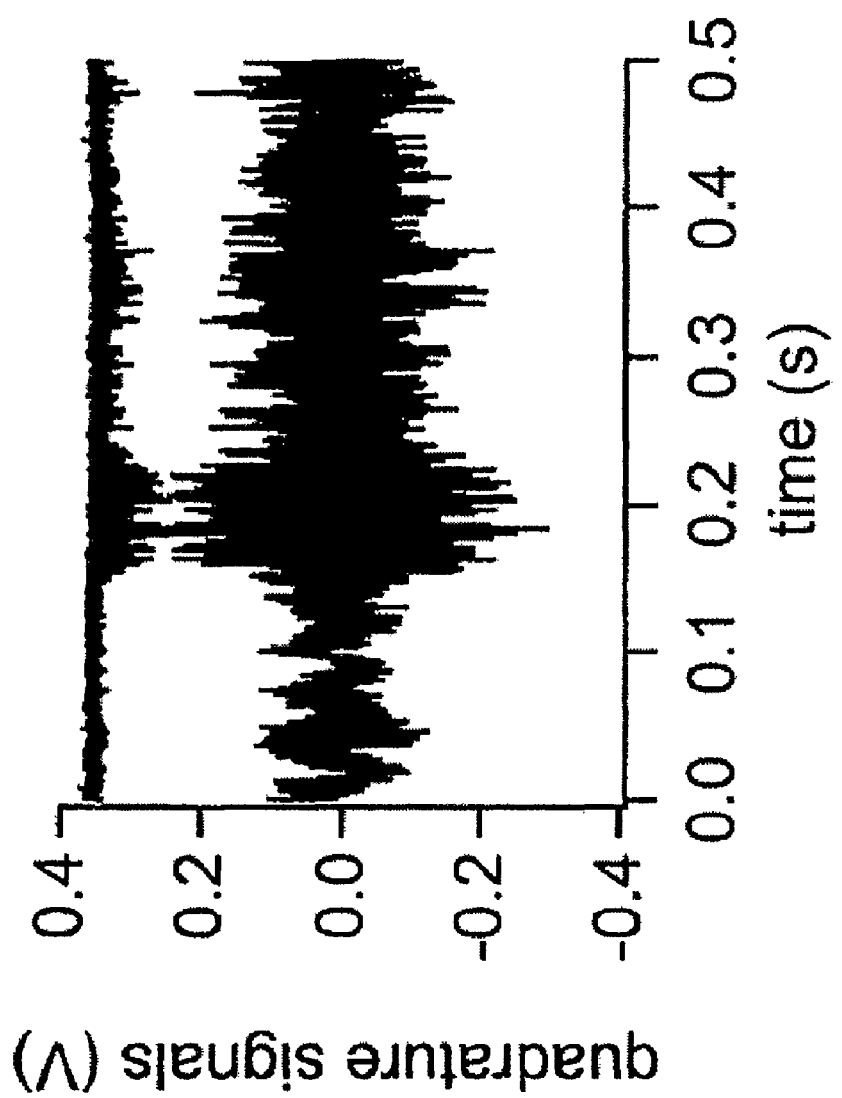
FIG. 4 is a graphical illustration of measured quadrature voltages X(t) and Y(t) in the case of weak feedback in accordance with one embodiment of the present disclosure.
Figure 5:
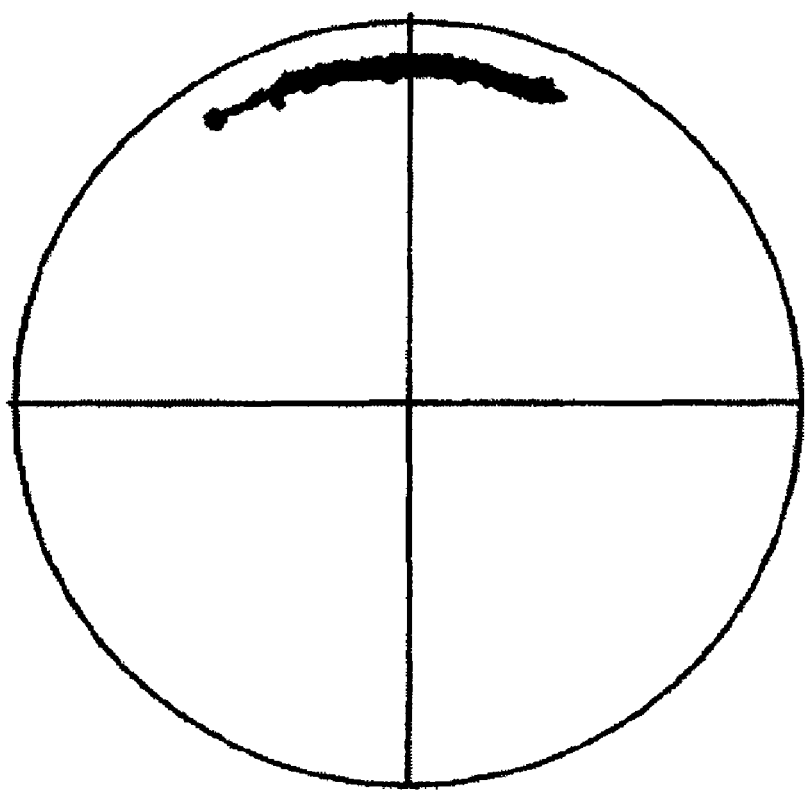
FIG. 5 is the corresponding polar plot for FIG. 4.

Referring now to FIG. 4, illustrated is a graph showing the measured quadrature voltages X(t) and Y(t) in the case of weak feedback. As shown in FIG. 4, signals that represent Y(t) are generally grouped in the lower portion of the graph at about 0 V. Signals that represent X(t) are generally grouped at the upper portion of the graph, at about 0.4V. Referring to FIG. 5, illustrated is the corresponding polar plot showing the measured quadrature voltages X(t) and Y(t) in the case of weak feedback. As indicated by this polar plot, the phase angle remains within a range of about ±1 radian. More than 97% of the time, the phase angle is within ±0.5 radians. When feedback is active, the sine in Equation 9 may be linearized to get the following:

$$Y(t) = GK\frac{P_0}{2}\left[2\pi\left(\int^t v_2(t')dt' - v_1 t + v_{ref} t + 2x(t)/\lambda\right)\right]$$ (Equation 12)

wherein $x(t) = x_{slow}(t) + x_{fast}(t)$, and $x_{slow}$ represents motion that is sufficiently slow to fall within the servo bandwidth, and $x_{fast}$ represents motion that is outside the servo bandwidth, the equation being simplified as follows:

$$Y(t) = 2\pi GKP_0 x_{fast}(t)/\lambda$$ (Equation 13)

Based on Equation 9, the radius of the polar plot in FIG. 5 may be expressed as follows:

$$R = GK\frac{P_0}{2}$$ (Equation 14)

The radius is shown at the upper portion of the trace x(t) in FIG. 4. If the variables equivalent to the radius R shown in Equation 14 are substituted into Equation 13, then $x_{fast}(t)$ may be expressed as follows:

$$x_{fast}(t) = \frac{\lambda}{4\pi}\frac{Y(t)}{R}$$ (Equation 15)

Figure 6:
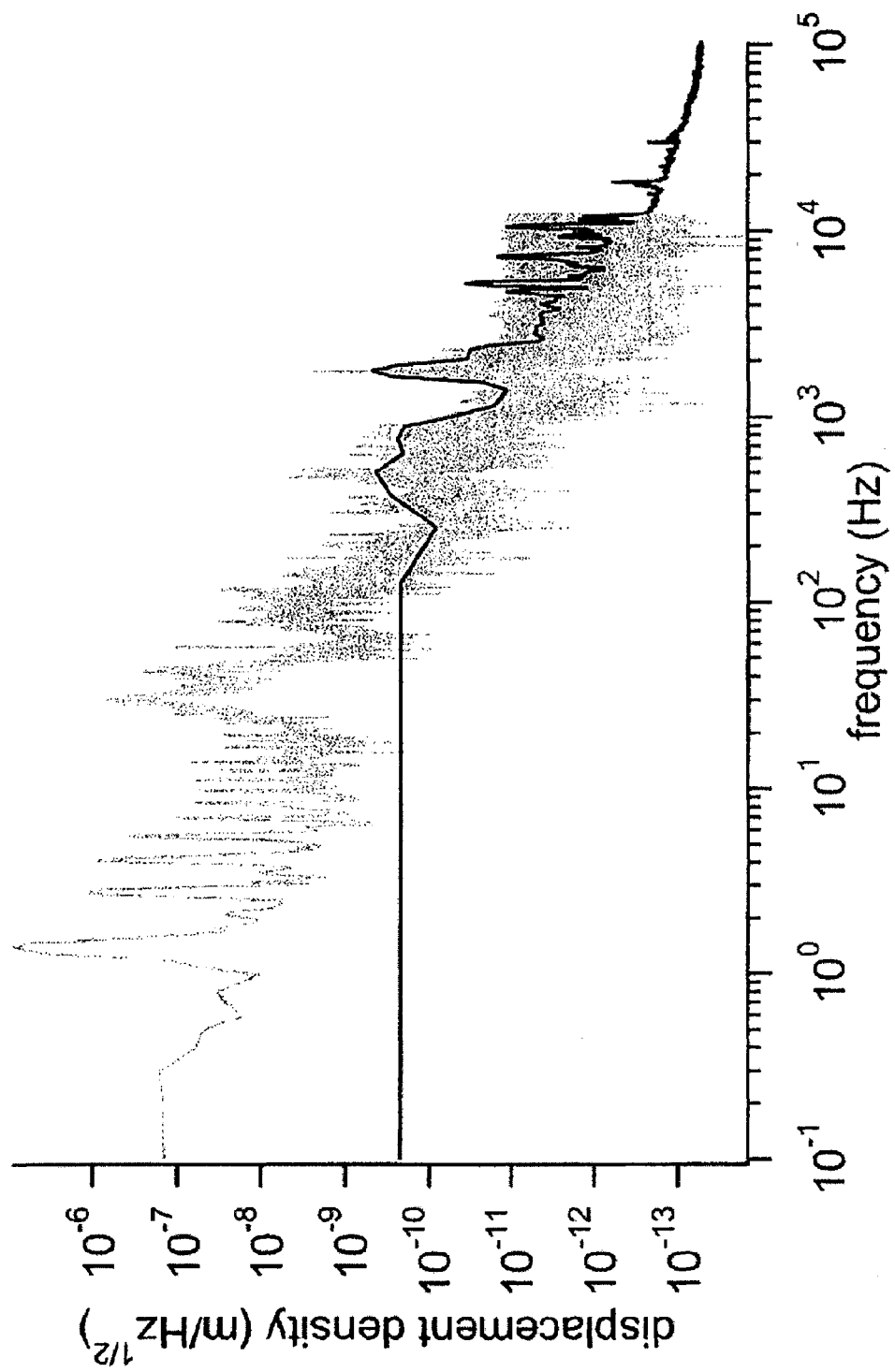
FIG. 6 illustrates results for position spectrum measurements when weak feedback is employed in accordance with one embodiment of the present disclosure.

Referring now to FIG. 6, shown is the spectrum of $x_{fast}$ that may be obtained by feeding the quadrature output Y(t) to a Fast Fourier Transform (FFT) spectrum analyzer and using Equation 15. The resulting spectrum for $x_{fast}$ in the case of weak feedback is shown superimposed on the spectrum for the case of no feedback that was previously shown in FIG. 3.

No phase unwrapping was needed, unlike what was required in the previous case of no feedback. As shown in FIG. 6, the weak feedback approach offers superior sensitivity and is much less noisy. On the other hand, the weak feedback approach was ineffective below approximately 300 Hz, because the measured displacements have been suppressed by the feedback. As shown in Equation 15 hereinabove, sensitivity of the voltage controlled oscillator sensitivity $K_{VCXO}$ is not required to determine displacement in the case of weak feedback.

Two cases were considered hereinabove. In the first case, there was no feedback; in the second case, feedback was weak. Considering another case where feedback is strong, and where the frequency is within the servo bandwidth, the condition given by the following equation, which was also previously expressed as Equation 11, is considered to be satisfied:

$$v_2(t) = v_1 - v_{ref} - 2\dot{x}(t)/\lambda$$ (Equation 16)

Therefore, the frequency $v_2$ is forced to a nominal value of $v_1-v_{ref}$. Accordingly, the frequency $v_2$ varies according to the following equation under the control of feedback:

$$\delta v_2 = 2\dot{x}(t)/\lambda \quad \text{(Equation 17)}$$

Variations in the frequency $\delta v_2$ are directly related to variations in the control voltage V of the voltage controlled oscillator according to the following equation:

$$\delta v_2 = K_{VCXO} V \quad \text{(Equation 18)}$$

and the following is also true:

$$\dot{x}(t) = \frac{\lambda}{2} K_{VCXO} V(t) \quad \text{(Equation 19)}$$

The velocity of the target mirror can be shown to be directly related to the control voltage V that is employed for the voltage controlled oscillator. Unlike the case of weak feedback, this equation does not involve radius R as Equation 14 does.

The control voltage V may be sent to a spectrum analyzer, such as a Fourier Transform spectrum analyzer. As a result, the velocity spectrum |v(v)| may be inferred via equation 18. Where the velocity spectrum may be inferred, the position spectrum can also be inferred. The converse is also true. In order to convert a velocity spectrum to a position spectrum, the following equation may be used:

$$|x(v)| = \frac{|\dot{x}(v)|}{2\pi v} \quad \text{(Equation 20)}$$

Figure 7:
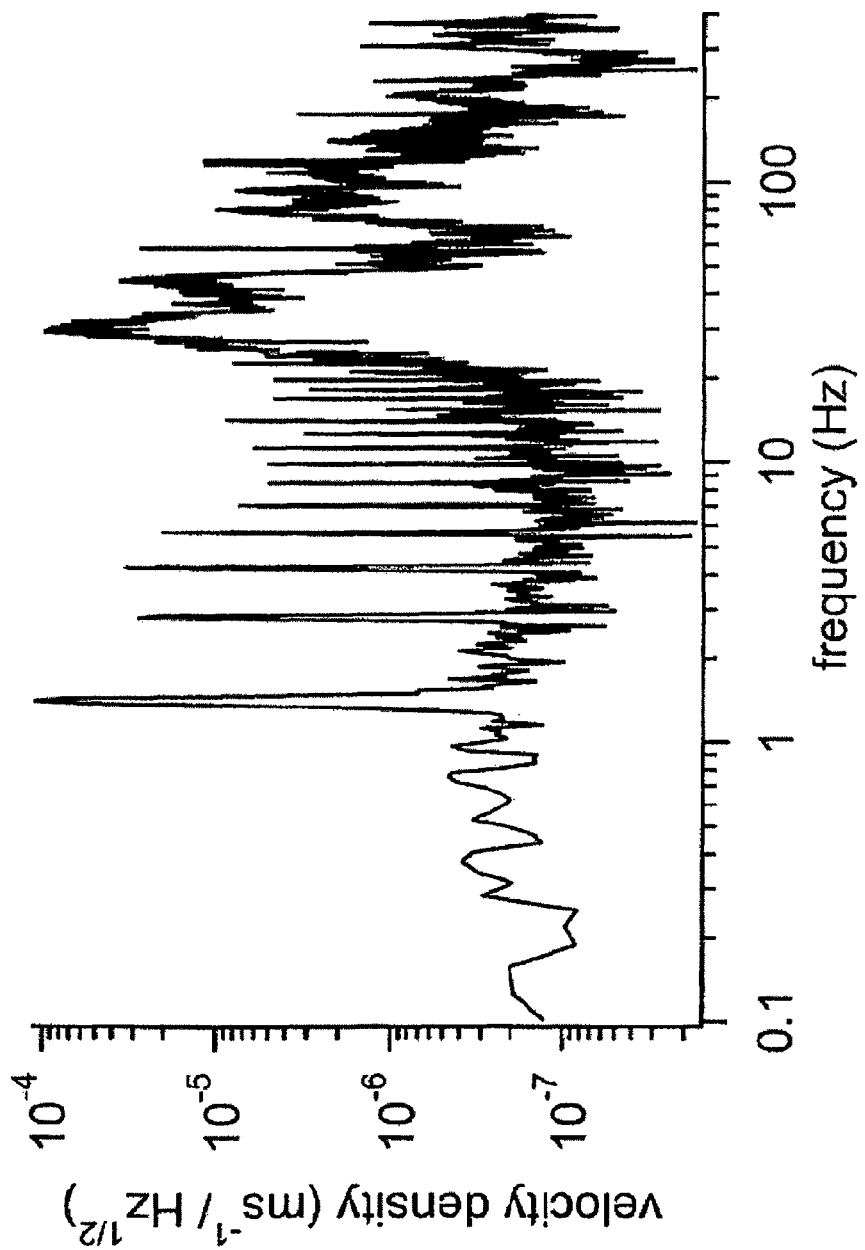
FIG. 7 illustrates results for velocity spectrum measurements when strong feedback is employed in accordance with one embodiment of the present disclosure.

Referring now to FIG. 7, illustrated are results of velocity spectrum measurements in accordance with one embodiment of the present disclosure. The resulting root mean square velocity, obtained by integrating over frequency, is 200 µm/s, which corresponds to a root mean square Doppler shift ($\delta v = 2v/\lambda$) of about 670 Hz. This root mean square Doppler shift of 670 Hz easily falls within the 15 kHz range of the voltage controlled oscillator.

Figure 8:
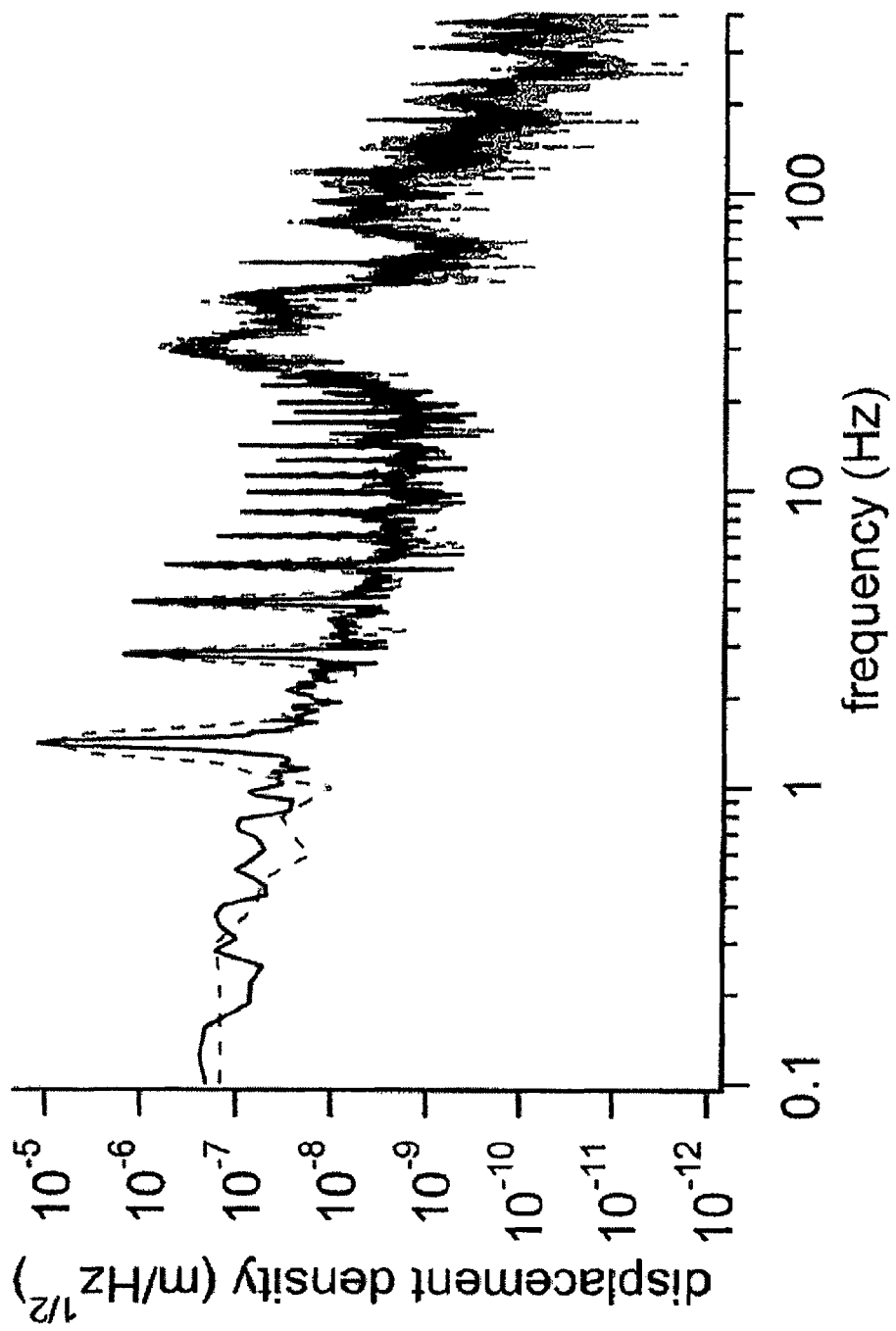
FIG. 8 illustrates results for an inferred position spectrum that was obtained based on the velocity spectrum of FIG. 7.

Referring now to FIG. 8, illustrated are results shown for the inferred position spectrum that was obtained based on the velocity spectrum of FIG. 7. The position displacement spectrum was obtained by dividing the velocity spectrum by $2\pi v$. FIG. 8 not only shows the position spectrum, but also shows the superimposed results from the spectrum of FIG. 3 which were obtained through the prior art method of phase unwrapping. The superimposed results are indicated in FIG. 8 by the dashed gray line.

FIG. 8 illustrates a substantial agreement between the inferred position spectrum obtained via strong feedback and the spectrum by the prior art technique of phase unwrapping. While there is substantial agreement, FIG. 8 also suggests superior results for the feedback method in that the peaks are substantially narrower and the spectrum is less noisy.

Previously discussed herein were performance results: (a) a situation where no feedback was used; (b) a situation where weak feedback was used in a low gain mode of the LDV vibrometer system; and (c) and a situation where strong feedback was used in a high gain/high servo bandwidth mode of the LDV vibrometer system. It is also useful to illustrate the substantial overlap between the low-gain and high-gain measurements. As will be shown in connection with the next set of results, a broad range of frequencies exist over which the low-gain and high-gain measurements agree.

Figure 9:
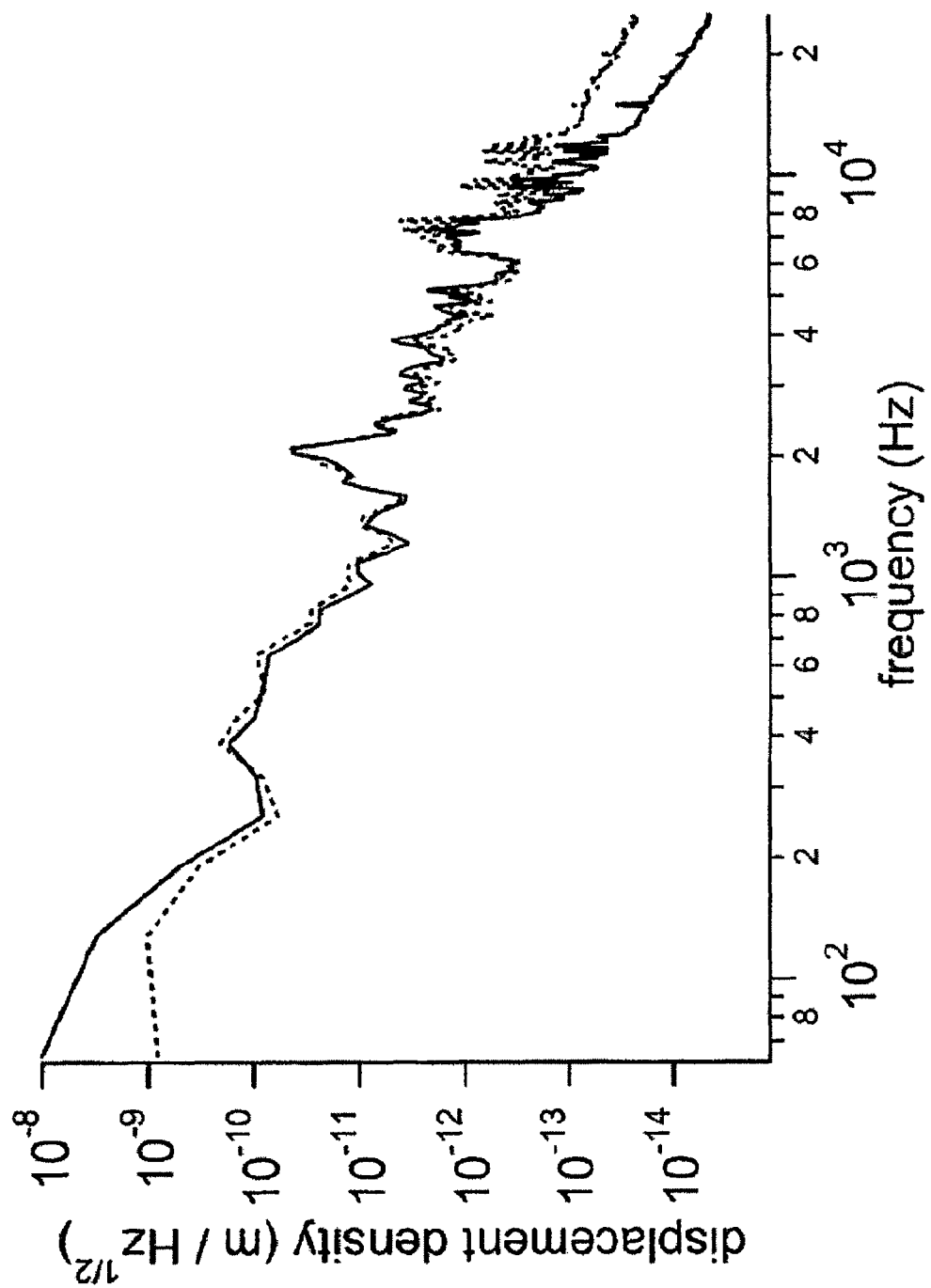
FIG. 9 illustrates results for a position spectrum obtained with a high-gain signal as well as a position spectrum obtained with a low-gain signal in accordance with one embodiment of the present disclosure.

Referring now to FIG. 9, illustrated is a position spectrum obtained with a high-gain signal (solid line) and a position spectrum obtained with a low-gain signal (dotted line). The high gain and low gain signals were taken at frequencies from about 64 Hz to about 51.2 kHz. As shown, there is a significant overlap between the two signals in a frequency range from about 256 Hz to about 6 kHz.

Figure 10:
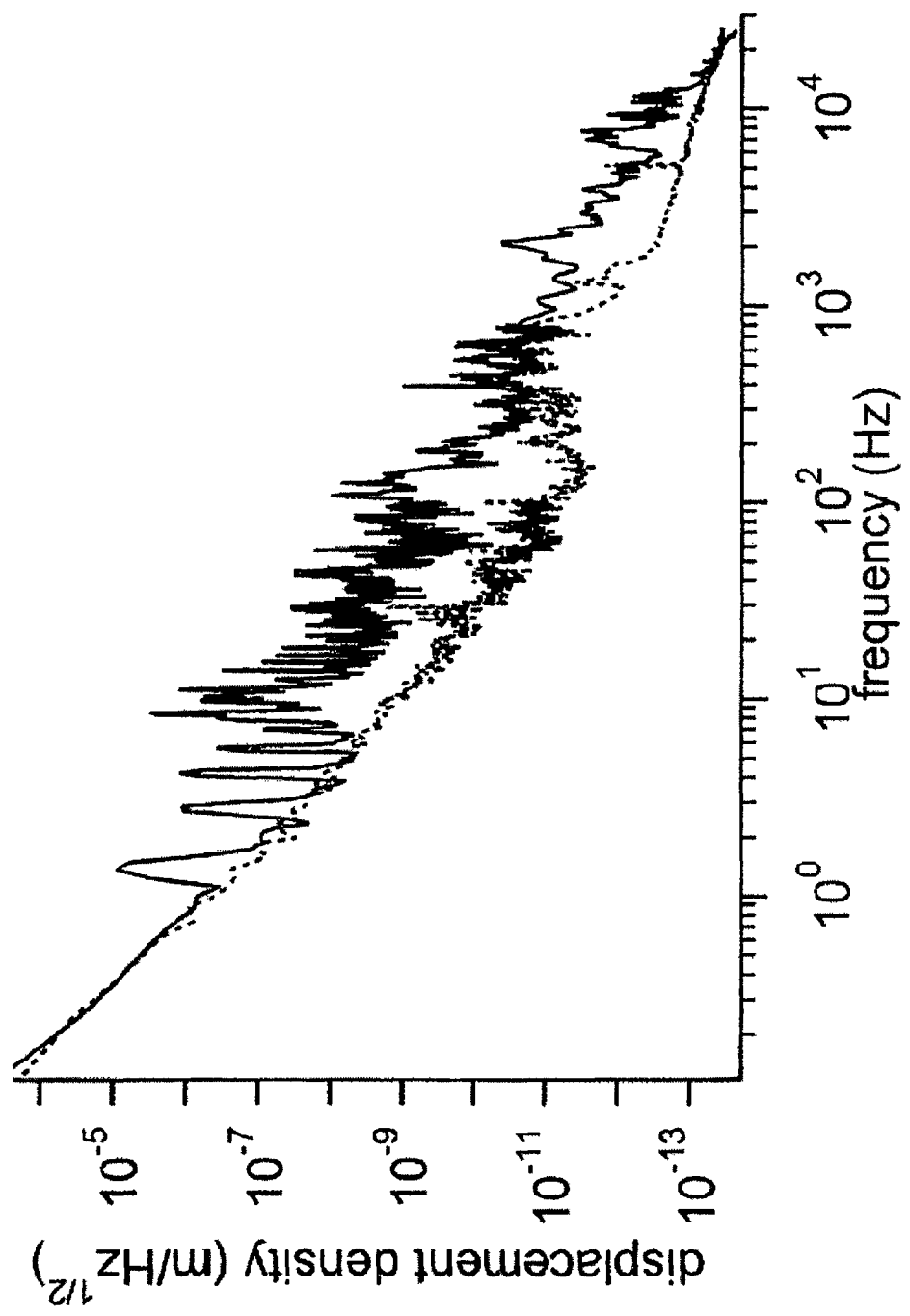
FIG. 10 illustrates a typical complete spectrum where the data has been concatenated and joined together in accordance with one embodiment of the present disclosure.

The data shown in FIG. 9 may be taken in three sets and concatenated. Referring now to FIG. 10, illustrated is a typical complete spectrum where the data have been concatenated and joined together. The upper trace of this graph represents the measurement for the vibrating test object (cryostat). The lower trace of this graph represents the noise floor, which will be discussed in greater detail later in connection with FIG. 11.

In FIG. 10, this complete spectrum for the cryostat vibration measurements includes two high-gain spectra and one low-gain spectrum. The high gain results were obtained by concatenating two spectra, the first spectrum being from DC to 100 Hz, and the second high spectrum being from 100 Hz to 800 Hz. The low gain results cover a range of 800 Hz to 51.2 kHz. The position spectrum is shown over more than five decades of frequency: the spectrum starts at about 0.1 Hz; the spectrum ends at 25 kHz. Points above 25 kHz were suppressed, since they were beyond the Nyquist frequency that corresponds to the 20 µs time constant that was used.

As shown in FIGS. 9 and 10, a significant decline in amplitude occurs as frequency increases. Because the spectrum covers more than five decades of frequency, it may be useful to determine how the noise floor of the present LDV system varies over this relatively broad frequency range.

Figure 11:
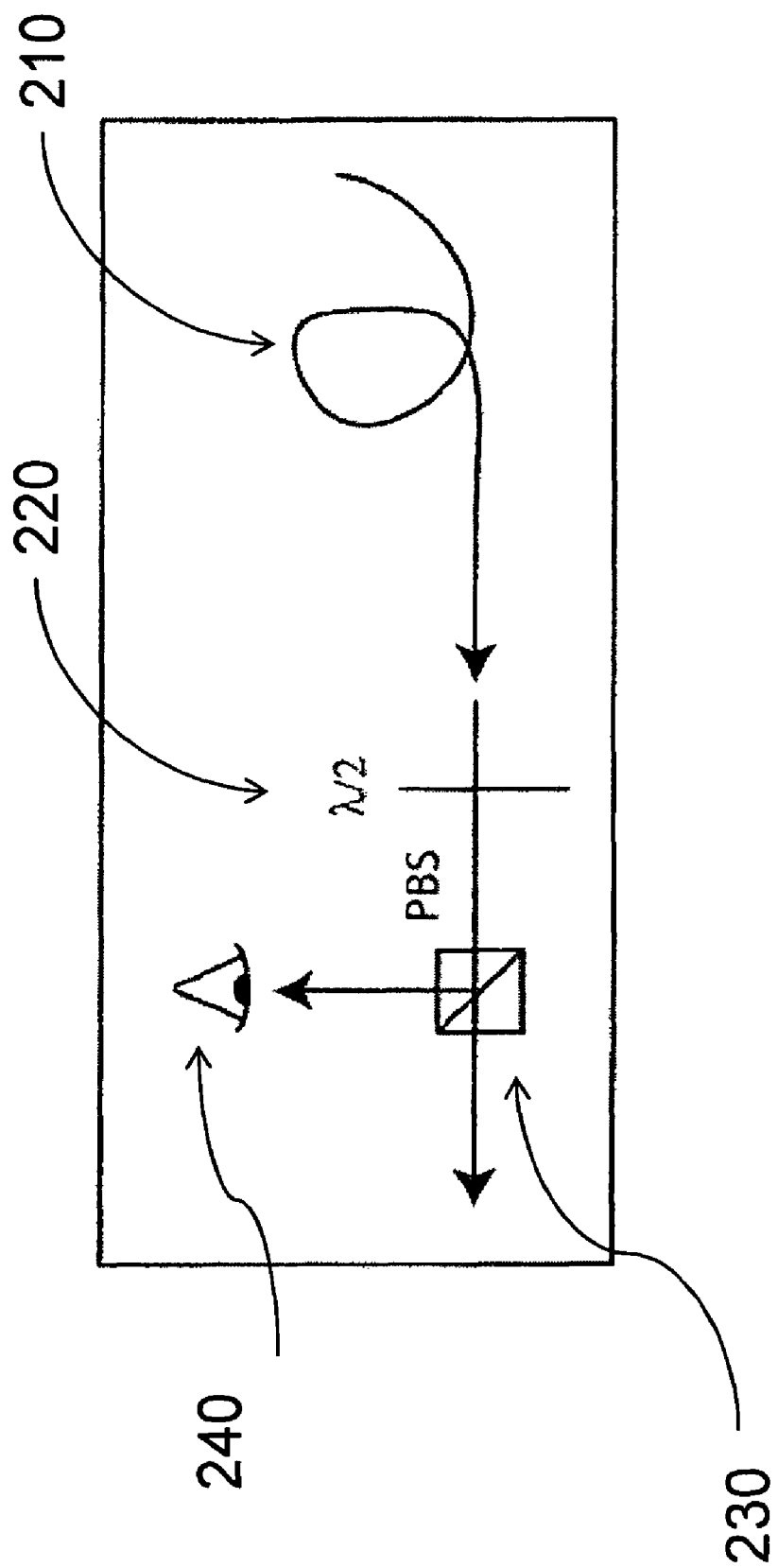
FIG. 11 illustrates a noise floor evaluation configuration used to create a displacement-insensitive signal and to measure the noise floor of the present LDV system.

In FIG. 11, illustrated is a noise floor evaluation configuration used to create a displacement-insensitive signal and to measure the noise floor. This configuration includes a polarization-maintaining single-mode fiber 210, half-wave plate 220, polarizing beam splitter 230 and photodetector 240.

Using this configuration, the interference signal that is produced represents the noise floor. The noise floor decreases with frequency at a pace of about $1/f^{2.5}$ for frequencies below 100 Hz. The noise floor also decreases with frequency at a pace of about $1/f^{0.9}$ for frequencies above 2.5 kHz. For frequencies between about 100 Hz and 2 kHz, there is a significant increase in the noise floor. Air turbulence may be the cause of this noise floor increase. Air turbulence may arise where the laser beam is split, frequency-shifted and recombined.

Rise in the noise floor at low frequencies, e.g., below 100 Hz, may be attributable in part to the integrator in the frequency control servo. The integrator has a gain proportional to 1/f.

Noise may be better understood by driving the acousto-optic modulators with different oscillators. Using different oscillators is indicated since it is possible that frequency noise from the oscillator is a contributing factor to the noise.

Figure 12:
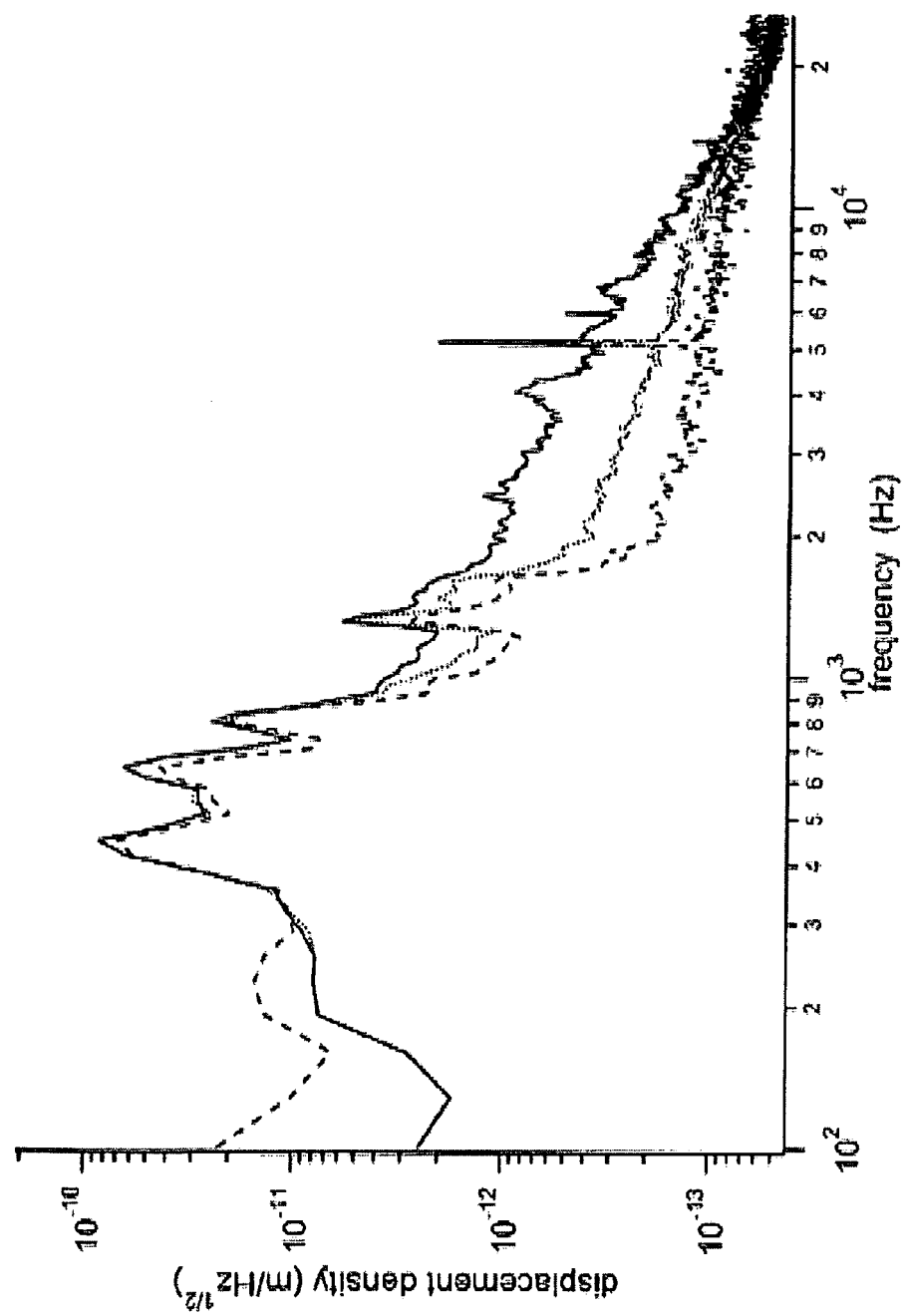
FIG. 12 is a graphical illustration of an interference signal obtained using different oscillators for the present LDV system.

Referring now to FIG. 12, a graphical illustration is shown of the interference signal obtained using different oscillators. In FIG. 12, the top trace shows results when the fixed-frequency acousto-optic modulator (125 of FIG. 1) was driven by a synthesizer that employed direct digital frequency synthesis. As illustrated, the results are noisier. This result appears to indicate the importance of driving the acousto-optic modulator having fixed frequency with an oscillator having low phase noise.

The center trace shows results when the fixed-frequency acousto-optic modulator (125 of FIG. 1) is driven by a synthesizer that employs frequency multiplication of a high-quality fixed reference oscillator.

The bottom trace shows the situation where the two acousto-optic modulators (125, 130 of FIG. 1) are driven by different synthesizers, both of which employ frequency multiplication of a high-quality fixed reference oscillator. Feedback is not possible in this situation. Accordingly, it was necessary to set the frequency difference imposed by the acousto-optic modulators to be as near as possible to the lock-in demodulation frequency and to obtain data when the phase difference was substantially zero.

This graph also indicates that frequency noise from the voltage-controlled oscillator is a substantial contributor to the noise floor in the frequency range above 2 kHz. If this frequency noise is caused by electronic noise at the input to the voltage controlled oscillator, then it may be helpful to choose a voltage controlled oscillator having the minimum sensitivity necessary to safely cover the range of Doppler shifts that may be imposed by the target mirror. At the highest frequencies illustrated in FIG. 12, the signal level is close to the signal level that corresponds to a combination of detector noise and laser shot noise.

While the specification describes particular embodiments of the present invention, those of ordinary skill can devise variations of the present invention without departing from the inventive concept.

I claim:

1. A laser Doppler vibrometer system that employs active frequency feedback for measuring mechanical vibrations of a test object, comprising:
   a first optical system having a light source, the first optical system being configured to generate two beams, the first optical system having an acousto-optic modulator driven by a voltage-controlled oscillator, said acousto-optic modulator and voltage-controlled oscillator being configured to cause one of said beams to be controllably shifted in frequency relative to the other of said beams;
   a second optical system having a Michelson interferometer configuration, the second optical system having two arms, the two arms being configured to receive the two beams from the first optical system, wherein the first of said arms employs a reflective vibrating test object that is configured to retroreflect a first beam that travels to the reflective vibrating test object, and the other of said arms employs a static reference mirror that is configured to retroreflect a second beam that travels to the static reference mirror, and wherein the second optical system is configured to recombine the two retroreflected beams from the vibrating test mirror and the static reference mirror so as to generate an optical interference signal;
   a conversion device configured to receive the two beams from the second optical system, the conversion device being further configured to convert one or more optical signals into an electrical signal;
   a phase meter device configured to provide a phase difference between the frequency signal received from the photodetector and a reference signal, the phase meter device being further configured to output the phase difference as a voltage;
   a controller configured to close a feedback loop; and
   wherein, when the feedback loop is closed, a frequency shift imposed by the voltage-controlled oscillator cancels the Doppler shift imposed by the motion of the vibrating test object so that the phase difference between the frequency signal at the output of the photodetector and the reference signal of the phase meter is substantially zero.

2. The laser Doppler vibrometer system of claim 1, further comprising:
   a polarization-maintaining single mode fiber disposed between the first optical system and the second optical system.

3. The laser Doppler vibrometer system of claim 2, wherein the light source is a laser, and further comprising:
   an optical isolator disposed at the output of the laser.

4. The laser Doppler vibrometer system of claim 1, wherein the conversion device is a photodetector.

5. The laser Doppler vibrometer system of claim 1, wherein the phase meter device is a lock-in amplifier.

6. The laser Doppler vibrometer system of claim 1, wherein the second optical system includes two quarter wave retarders, the quarter wave retarders being configured to reverse the polarization of reflected light from the two beams such that the two beams are output from the second optical system in a direction perpendicular to the direction in which they were input into the second optical system.

7. The laser Doppler system of claim 1, wherein the reflective vibrating test object comprises a target mirror.

8. A laser Doppler vibrometer system that employs active frequency feedback for measuring mechanical vibrations of a test object, comprising:
   a laser light source configured to generate a laser light beam;
   a first polarizing beam splitter that is configured to receive a laser light beam from the laser light source and split the laser light beam into two beams, each of said two beams having orthogonal linear polarizations;
   a first acousto-optic modulator configured to shift the frequency of one of the said beams by a fixed amount;
   a second acousto-optic modulator configured to shift the frequency of the other of the said beams by a variable amount;
   a voltage-controlled oscillator configured to drive one of said acousto-optic modulators;
   a Michelson interferometer optical system configured to receive the two beams from the first optical system, the Michelson interferometer optical system having two arms, wherein the first of said arms employs a reflective vibrating test object that is configured to retroreflect the first beam that travels to the vibrating test object, and the other of said arms employs a static reference mirror that is configured to retroreflect the second beam that travels to the static reference mirror, and wherein the Michelson interferometer optical system is configured to recombine the two retroreflected beams from the reflective vibrating test object and the static reference mirror;
   a polarization analyzer configured to receive the two beams from the Michelson interferometer optical system, the polarization analyzer being further configured to generate an optical interference signal;
   a photodetector configured to receive one or more optical interference signals, the photodetector being further configured to convert one or more optical interference signals that were received from the polarization analyzer into one or more electrical interference signals;
   a lock-in amplifier having a reference signal, the lock-in amplifier being further configured to provide a phase difference between the one or more electrical interference signals received from the photodetector and the reference signal, the lock-in amplifier being further configured to output the phase difference as a voltage;
   a controller configured to close a feedback loop; and
   wherein, when the feedback loop is closed, a frequency shift imposed by the voltage-controlled oscillator cancels the Doppler shift imposed by the motion of the vibrating test object so that the phase difference between the frequency signal at the output of the photodetector and the reference signal of the phase meter is substantially zero.

9. The laser Doppler vibrometer system of claim 8, further comprising:
a polarization-maintaining single mode fiber disposed at the input of the Michelson interferometer optical system; and
an optical isolator disposed at the output of the laser.

10. The laser Doppler vibrometer system of claim 8, wherein the polarization analyzer includes a half-wave plate and a second polarizing beam splitter.

11. The laser Doppler vibrometer system of claim 8, wherein the reflective vibrating test object comprises a target mirror.

12. The laser Doppler vibrometer system of claim 8, wherein the Michelson interferometer includes two quarter wave retarders, the quarter wave retarders being configured to reverse the polarization of reflected light from the two beams such that the two beams are output from the Michelson interferometer optical system in a direction perpendicular to the direction in which they were input into the Michelson interferometer optical system.

13. The laser Doppler vibrometer system of claim 8, wherein the voltage controlled oscillator drives the second acousto-optic modulator, and a synthesizer drives the first acousto-optic modulator.

14. A method for measuring mechanical vibrations of a test object using a laser Doppler vibrometer system that employs active frequency feedback, the method comprising the steps of:
generating two optical laser beams, each of said beams having different controllable optical frequencies, the first beam having a fixed frequency shift, the second beam having a tunable frequency shift relative to a substantially fixed laser frequency, wherein the step of generating two optical laser beams includes the step of driving an acousto-optic modulator with a voltage-controlled oscillator;
receiving the two generated optical laser beams at a Michelson interferometer, the Michelson interferometer having two arms, wherein the first of said arms employs a reflective vibrating test object that is configured to retroreflect a first beam that travels to the reflective vibrating test object, and the other of said arms employs a static reference mirror that is configured to retroreflect a second beam that travels to the static reference mirror, and wherein the Michelson interferometer is configured to recombine the two retroreflected beams from the reflective vibrating test object and the static reference mirror;
generating an optical interference signal;
converting the optical interference signal into an electrical interference signal;
determining a phase difference between the electrical interference signal and a reference signal;
expressing the phase difference as a voltage;
closing a feedback loop; and
forcing a frequency shift imposed by the voltage controlled oscillator to cancel the Doppler shift imposed by the reflective vibrating test object such that the phase difference is substantially zero.

15. The method of claim 14, wherein the step of generating two optical laser beams includes the step of driving a second acousto-optic modulator with a synthesizer.

16. The method of claim 14, wherein:
the step of generating two optical laser beams includes the steps of:
emitting a single laser beam from a laser source;
providing an optical isolator at the output of the laser source;
splitting the single laser beam with a polarizing beam splitter; and
prior to the step of receiving the two generated optical laser beams at a Michelson interferometer, the step of receiving the two generated optical laser beams at a polarization-maintaining single mode fiber.

17. The method of claim 14, wherein the step of determining a phase difference between the electrical interference signal and a reference signal, and the step of expressing the phase difference as a voltage are performed by a phase meter device.

18. The method of claim 14, wherein the step of converting the optical interference signal into an electrical interference signal is performed by a photodetector.

19. The method of claim 14, wherein the reflective vibrating test object comprises a target mirror.

* * * * *